INVENTORS
F. LOUZIL
A. APPEL &
G. PODEST
BY
Frank R. Trifari
AGENT

April 18, 1967
F. LOUZIL ETAL
CONTROL FOR TAPE DRIVE OF AUTOMATIC THREADING RECORDER/REPRODUCER
3,314,624
Filed June 21, 1963
3 Sheets-Sheet 2

INVENTORS
F. LOUZIL
A. APPEL &
G. PODEST
BY
Frank R. Trifari
AGENT

April 18, 1967 F. LOUZIL ETAL 3,314,624

CONTROL FOR TAPE DRIVE OF AUTOMATIC THREADING RECORDER/REPRODUCER

Filed June 21, 1963

3 Sheets-Sheet 3

INVENTORS
F. LOUZIL
A. APPEL &
G. PODEST

BY Frank R. Trifari
AGENT 3,314,624

CONTROL FOR TAPE DRIVE OF AUTOMATIC THREADING RECORDER/REPRODUCER

Friedrich Louzil, Arne Appel, and Germann Podest, Vienna, Austria, assignors to North American Philips Company, Inc., New York, N.Y., a corporation of Delaware Filed June 21, 1963, Ser. No. 289,690

Claims Priority application, Austria, July 4, 1962, A 5,369/62

4 Claims. (Cl. 242—55.12)

This invention relates to a tape recorder/reproducer of the type described in U.S. Patent No. 3,154,236. Recorders of this type have a slide which is manually or mechanically moved for withdrawing a supply of tape for a magazine and placing the tape in position to be wound on a take-up reel. The take-up reel is driven continuously through a slip-clutch arrangement. However, the tape, for recording and reproducing, is driven by a capstan and pressure roller in the usual manner.

The problem, to which this invention is directed, relates to the formation of loops in the tape with such a recorder. When tape is drawn from the supply source, but before it is wound on the take-up reel, it can be clamped between the rotating capstan and the pressure roller thus forming loops in the tape which can cause it to be broken. In order to prevent the formation of these loops, the pressure roller must not engage the tape until it is being wound on the take-up reel.

A primary object of the invention therefore is to provide a recorder/reproducer of the type noted with automatic apparatus to prevent operation of the pressure roller until tape is being wound on the take-up reel.

In conjunction with the apparatus for automatically preventing operation of the pressure roller when the tape is being threaded on the recorder, a quick-stop arrangement is provided for stopping the tape in any desired position.

In order that the invention may readily be carried into effect, a few embodiments thereof will now be described more fully, by way of example, with reference to the accompanying drawing, in which it should be noted that the invention is not restricted to these embodiments. In particular the use of purely mechanical or electro-mechanical or electro-mechanical means for switching on the driving of the reel and for moving the pressing means for the driving shaft of the tape are to be considered as equivalent.

In the drawing, FIG. 1 shows diagrammatically a device in which the driving of the reel is effected purely mechanically through a key and the displacement of the pressing means is switched electromagnetically, the control being effected by a conductive lining on the tape.

Figure 4:
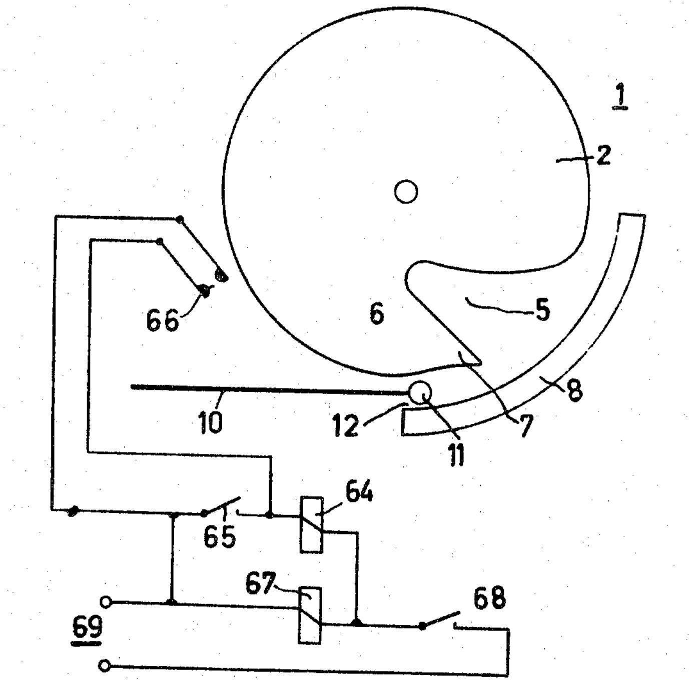

FIG. 4 diagrammatically shows a device in which elongations extending outwardly from the circumference of the flanges of the reel ensure both the catching of the tape extension and the electromagnetic control of the pressure roller for driving the tape.

Figure 1:
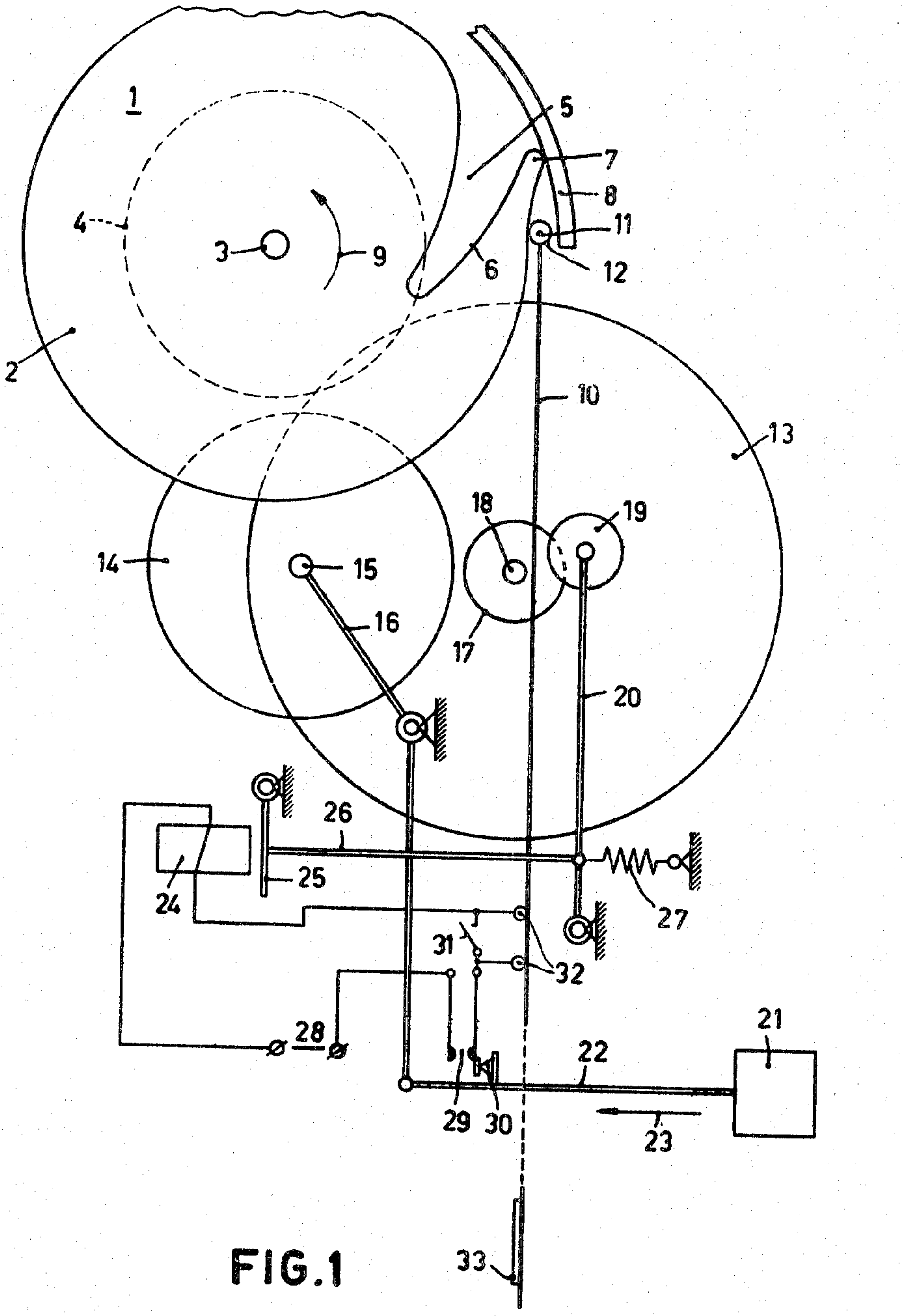

In the device shown in FIG. 1, the winding device 1 consists of a reel with flanges 2 which is connected in a fixed or detachable manner to the shaft 3 of a driving wheel 4. The flanges have recesses 5, the inclined sides 6 of which are provided with elongation 7. Along part of the circumference of the reel a wall 8 is located. If the reel 2 is rotated in the direction of the arrow 9, it catches, with the elongations 7, the extension 11 provided at the beginning of the tape 10 and takes it along as soon as it is inserted into the aperture 12 between the flanges of the reel 2 and the wall 8. Naturally, the width of the tape extension 11 should exceed the distance between the inner sides of the flanges of the reel. The extension 11 slides along the inclined sides 6 towards the core of the reel 2 and is fixed there in a recess by the turns of the tape which are wound on it. In the position of the reel 2 shown, it would have to make nearly one rotation before it would catch the extension 11 and exert a pull on the tape.

Driving of the reel 2 is derived through an idler wheel 14 from a flywheel 13 which is driven by a motor (not shown) through a belt (which is not shown either). This idler wheel 14 consists of two discs on a common shaft 15, said discs being connected together by a friction lining interposed therebetween and forming a slip clutch of known design. The idler wheel 14 is moved into driving position by means of the swing lever 16, one disc engages the driving wheel 4 of the take-up reel 2, while the other disc engages a disc 17 connected with the flywheel 13.

The shaft or capstan 18 of the flywheel 13 serves as driving shaft of the tape 10 during recording and/or play-back. A pressure roller 19 which is provided on a pivotable lever 20 ensures the necessary contact between the tape 10 and the shaft or capstan 18.

By operating the key 21, the swing lever 16 is rotated through a switching rod 22 thereby starting the driving of the take-up reel 2. The arrow 23 indicates the direction of the movement of the sliding rod 22 when the key 21 is operated.

The turning of the lever 20 with the pressure roller 19 is effected electromagnetically by means of a relay 24, its armature 25 and the switching rod 26. A spring 27 determines the rest condition of this system. A battery 28 supplies the current circuit of the relay 24. In this current circuit is further connected the make contact 29 which, when the key 21 is operated, is closed by a pressing member 30 at the switching rod 22. In parallel with one another are further connected in this circuit a holding contact 31 of the relay 24 and the contacts 32 provided as feelers in the path of the tape 10, which contacts are connected together when a conductive layer 33 provided on the non-conductive tape 10 passes across it. The current pulse then causes the relay 24 to respond which is energized by its holding contact 31 until the current circuit is interrupted again by operating the key 21.

As already stated, the pull at the tape 10 becomes operative only at the instant at which the elongations 7 catch the extension 11. During the period from the beginning of the rotation of the reel 2 until the catching of the extension 11 by the elongation 7 the switching on of the pressure roller 19 must consequently be delayed. Consequently, if such a length of tape has already been drawn out of the magazine that the extension 11 is located in the aperture 12, the conductive layer 33 must still be located at a certain distance from the feeler contacts 32. The lapse of time between the actuation of the driving of the take-up reel 2 and the reaching of the contacts 32 is then larger than the lapse of time until the catching of the tape extension 11 by the elongations 7

Figure 2:
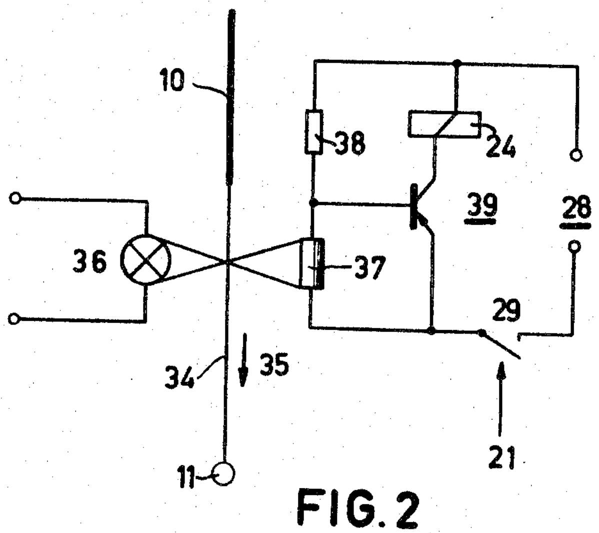
FIG. 2 shows a variation of the device shown in FIG. 1, in which the mark is formed by the transition from a transparent starting tape to an opaque record carrier and a photo-electric device is used for scanning this mark.

The device shown in FIG. 2 differs from the device shown in FIG. 1 only in that it comprises a different construction of the current circuit of the relay and the mark with feeler. A transparent piece of starting tape 34 to which the extension 11 is connected is attached to the record carrier 10 which in this case is assumed to be opaque as is the case, for example, with magnetic tape. The direction of travel of the tape is indicated by an arrow 35. A light source 36 illuminates a light-sensitive resistor 37 as long as the elongation of the tape passes. The resistance value in this condition is low. As soon as the light source is darkened by the opaque tape 10, the resistance value strongly increases. The light-sensitive resistor 37 and a constant resistor 38 constitute a potentiometer to which the base of a transistor 39 is connected. The values of the resistors 37 and 38 are chosen so that the emitter collector path of the transistor 39 is non-conductive as long as the value of the resistor 37 remains low, and becomes conductive as soon as the value of the resistor 37 becomes high-ohmic, so when the light source 36 is covered by the opaque tape 10. The relay 24 is connected in the collector circuit of the transistor 39. In this case the holding contact 31 is not necessary. The length of the tape extension 34 is determined by what was said with reference to FIG. 1 about the distance of the conductive lining 33 of the tape extension 11.

Figure 3:
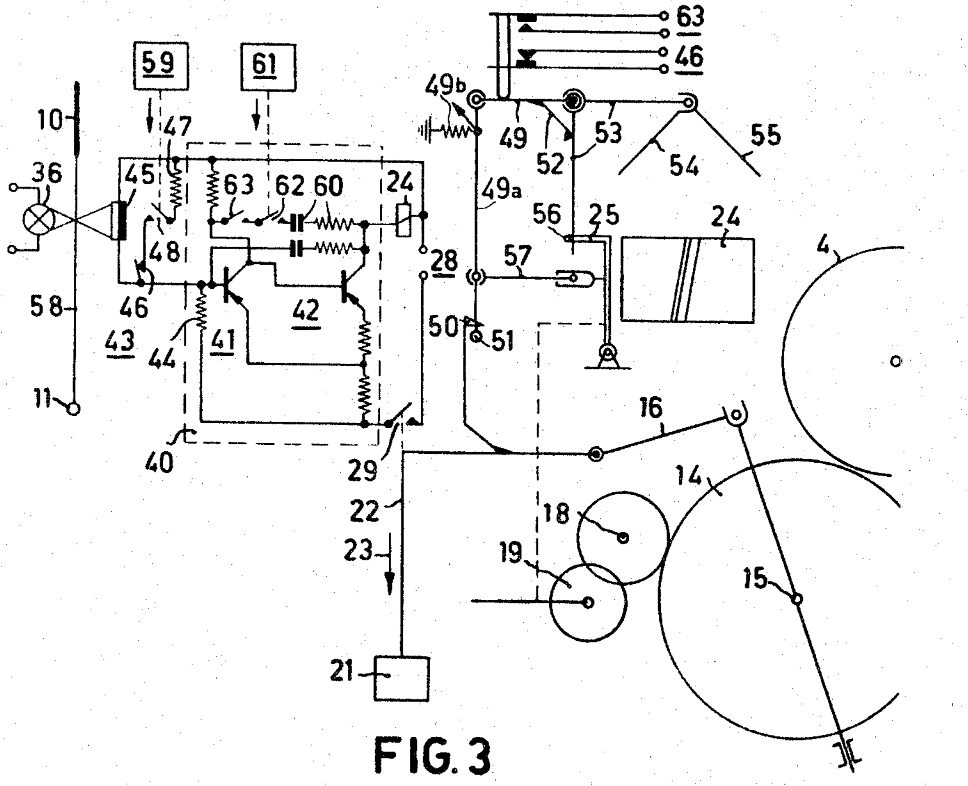
FIG. 3 shows the diagram for the device of a quick-stop key with which, for recording, the tape can be stopped at a given distance from the starting end of the tape.

FIG. 3 shows diagrammatically how apparatus shown in FIG. 1 provided with a light beam control according to FIG. 2 can be provided with a quick-stop arrangement which automatically ensures stopping of the tape at any time. In as far as the component parts have the same functions, they are indicated in FIGS. 1 and 3 by the same reference numerals. The component parts which are unimportant for a good understanding of the quick stop device are not shown in FIG. 3 for the sake of clarity.

When the reel 4 is placed in operation by keys 21, the draw bar 22 is moved in the direction of the arrow 23 and consequently the lever 16 with the idler wheel 14 is moved to drive the reel 2 via driving wheel 4. Simultaneously, the switch 29 of bistable multivibrator 40 is closed. The relay 24 (shown twice) for moving the pressure roller 19 is connected in the output circuit of this multivibrator which operates with two transistors 41 and 42. Other amplifier elements, for example tubes, may be used as well. The multivibrator 40 is controlled at the base of the first transistor 41 by a potentiometer 43. One branch of this potentiometer 43 consists of the constant resistor 44, and the other branch consists of a light-sensitive resistor 45.

The light-sensitive resistor 45 is shunted by a circuit which consists of a series arrangement of a constant resistor 47 and a make-contact 48, which make-contact is closed by operating the quick stop key 59. This shunt is operative only as long as the break contact 46 (shown twice) is closed. As long as key 21 is still in its rest condition, as is shown in FIG. 3, contact 46 is closed. However, when the key 21 is operated, the break contact 46 must be opened. This is effected as follows: when key 21 is operated the lever 49, to which the rod 49*a* is connected, is moved against the pull of a spring 49*b*, acting to the left upwards, by means of a hook 50 attached to the lever 16 which pulls on pin 51 provided on the rod 49*a*. Downward movement of rod 49*a* causes lever 53 to be rotated counterclockwise by means of the elongation 52 provided on the lever 49 whereby contact 46, shown in the upper right of FIG. 3, is opened. The brakes of the supply and the take-up reels are released by means of switching rods 54 and 55 connected to lever 53 and shown only diagrammatically. The lever 53 is not only connected to the lever 49, via elongation 52 but also to the armature 25 through a follower pin 56 provided on the armature 25 of the electromagnet 24. Finally, the rod 49*a* is also connected to the armature 25 through a lever 57 connected to said rod in a manner such that it is moved to the right when the armature attracts and a pivoting around the junction point with the armature 25 is possible.

The condition caused by operating the key 21, namely disengaging the brakes and opening break contact 46, remains only until the armature 25 of the magnet 24 attracts for the first time. Since the lever 57 is taken along to the right when the armature 25 attracts, the connection of the lever system 49, 49*a*, 53 and 57 to the key 21 is severed since 51 is moved to the right out of engagement with hook 50. The break contact 46 is closed again and remains permanently closed independent of the fact whether the armature 25 is moved. Now only the brakes 54 and 55 and the pressure roller 19 follow the movement of the armature. The lever system 49, 49*a*, 53, 57 together with the spring 49*b* constitute nothing else but a locking mechanism which is severed when the armature 25 attracts for the first time.

Thus by operating the key 21 the driving of the reel 2 is commenced by idler wheel 14 and the tape travels. Since the break-contact 46 is open at this time, only the light-sensitive resistor 45 is connected in the potentiometer 43. Light source 36 illuminates resistor 45 as long as the starting tape or transparent leader 58 passes it. The resistance value in this case is small. The resistance values in the potentiometer are chosen so that the first transistor 41 is conductive then. Accordingly, the second transistor 42 is non-conductive, the relay 24 receives no current and the pressure roller 19 does not engage the driving shaft 18 and the brakes are released. At the instant, however, when the magnetic tape 10 passes the light source 36 and blocks it the resistor 45 becomes high-ohmic, since the light source 36 is screened from it. The transistor 41 becomes non-conductive, the multivibrator 40 flips over and the relay 24 is energized. By the attraction of the armature 25 the pressure roller 19 is forced against the driving shaft or capstan 18. The record carrier 10 now starts travelling forward at normal tape speed and reel 2 slips relative to the idler 14. At the same time the connection of the levers 49 to the hook 50 is interrupted as a result of which the break-contact 46 is moved back into its closed or starting position. Current remains flowing through the relay 24 as long as the make contact 48 is open and the brakes 54 and 55 remain disengaged from the reels since the lever 53 is now held by the attracted armature 25 of the relay 24.

The make contact 48 is closed and contact 46 opened by lever 49 by operating the quick stop key 59. As already explained above, shunting contact 48 can become operative only when the break-contact 46 is also closed. The tape may be stopped at any point when the beginning of the magnetic tape 10 has passed the light source 36 during normal operation of the apparatus by means of the quick stop key 59. If the quick stop key 59 and contact 48 are operated with the starting tape 58 still travelling across the light path or even before operating the key 21 to start the reel, the tape will ultimately only travel until the transition between the starting tape 58 and the magnetic tape 10 passes the light source 36.

The light source and the light-sensitive resistor 45 may not be located at any point in a practical construction of an apparatus. Care must be taken that the magnetic tape 10 has reached the magnetic heads after tape 10 crosses the light path since no signal can be recorded on the transparent leader tape 58. For this purpose the RC-member 60 is provided together with the make contact 62 which is operated by key 61 for switching from play to record. This RC-member is given a very large time constant. In that case the flipping over of the multivibrator 40 to the currentless condition, because the resistor 45 becomes high-ohmic when the light source 36 is screened, is effected with delay and during this period an accurately determined length of magnetic tape is unwound, for example, in accordance with the choice of the time constant and the speed at which the tape of the take-up reel is driven, 10 to 20 cm. so that when the key 61 is operated for recording, magnetic tape 10 is certain to be against a magnetic head. This delay is entirely inoperative at normal tape speed. For this purpose, in series with the record make contact 62 a further make contact 63 (shown in the circuit and at the upper right FIG. 3) is connected. Contact 63 is closed only as long as the lever 49 is in the condition caused by operating the key 21, however this condition is discontinued by the attraction of the armature 25 and the contact 63 is opened.

Therefore contact 63 is closed only as long as the transparent leader tape 58 is being wound on reel 2.

In the device shown in FIG. 4, the elongations 7 of the take-up reel 2 control the switching of the pressing means (19 in FIG. 1) for which, again, a slow-acting electromagnet 64 with holding contact 65 is provided. Parallel to this holding contact 65 a contact 66 is connected which is temporarily closed on passing the elongations 7 of the winding device 1 operating as studs. For switching the idler wheel (14 in FIG. 1) for driving the take-up reel 12 an electromagnet 67 with switch 68 is provided instead of a key with mechanical transmission, said magnet being supplied by a battery 69. The delay time is chosen to be somewhat larger than the time required by the reel 2 to make one rotation.

Without leaving the scope of this invention, such an arrangement may also be built up so that the parts of the circuit which ensure the operation of the pressing means are constructed so that after operation of the common switch they respond only in a delayed manner, for example by using a slow-acting relay. The control of the tape or the take-up reel respectively has the great advantage on the contrary, however, that in such a control the delay time is not fixed but is independent of the time which elapses from the actuation of the driving of the reel until the catching of the extension. Should this time be varied by variations in the apparatus or by other causes, for example fluctuations in the mains, the delay time also is varied automatically.

Devices operating with mark and feeler may also be constructed purely mechanically without the use of magnets. For example, in the device shown in FIG. 1 the current circuit with the relay which becomes operative when operating the key 12 by closing the contacts 29, may be replaced by a mechanical spring device which is tensioned by operating the key 21 and released by a feeler 32 if a mark 33 passes said feeler 32.

What is claimed is:

1. A tape recorder/reproducer comprising, driven shaft means including a capstan, take-up reel means, magnetic tape including leader means, an idler wheel, means for moving said idler wheel into operative engagement with both said driven shaft and said take-up reel means, a pressure roller for urging said tape into contact with said driven shaft, means for moving said pressure roller into engagement with said shaft, delay means, electromagnetic means, switch means coupling said delay means to said electromagnetic means, means mechanically coupling said pressure roller moving means to said electromagnetic means, said delay means delaying engagement of said pressure roller with said driven shaft by delaying the activation of said electromagnetic means until said take-up reel accumulates said leader on the magnetic tape, means for actuating said delay means when said reel accumulates said leader thereon, quick stop means interconnected with said delay means and said electromagnetic means, said quick stop means adapted to actuate the electromagnetic means and thereby remove said pressure roller from said driven shaft, and a severable locking linkage means, said severable locking linkage means mechanically interconnecting said electromagnetic means, said switch means, said quick stop means and said delay means, means normally holding said switch means in closed position, and means for moving said locking linkage means to open said switch means, said quick stop means being isolated from said electromagnetic means and said delay means being operative when said switch means is open, said electromagnetic means being actuated subsequent to the operation of the delay means, said actuation of the electromagnetic means severing said locking linkage whereby said holding means returns said switch means to the normally closed position.

2. A tape recorder/reproducer according to claim 1 wherein said coupled delay means and said quick stop means comprises a bistable multi-vibrator circuit coupled with photo-electric means, the output circuit of said multivibrator circuit being coupled with said electro-magnetic means, an ohmic potentiometer including said photo-electric means connected to said multi-vibrator for controlling said multi-vibrator circuit, a switch coupled with said photo-electric means for shunting said photo-electric means, a make contact connected with quick stop means and a constant resistor in series with said make contact in said potentiometer; said severable locking linkage interconnecting said electro-magnet and both said means for moving said idler wheel and said means for moving said pressure roller.

3. A tape recorder/reproducer according to claim 2 wherein the said multi-vibrator circuit is coupled to a network having an RC member, and a play-back make-contact for delaying the flip-over operation of said multivibrator.

4. A tape recorder/reproducer according to claim 3 with the addition of a second make-contact in series with said play-back make-contact, said second make-contact being operatively connected with said severable locking linkage whereby said second make-contact is closed when said linkage is in its quick stop position.

References Cited by the Examiner

UNITED STATES PATENTS

| | | | |
|---|---|---|---|
| 2,891,736 | 6/1959 | Blaes | 242—55.12 |
| 2,952,416 | 9/1960 | Sampson | 242—55.12 |
| 3,025,011 | 3/1962 | Camras | 242—55.13 |
| 3,058,683 | 10/1962 | Wahlstrom | 226—92 X |
| 3,100,090 | 8/1963 | Goodell et al. | 242—55.13 |
| 3,103,318 | 9/1963 | Van Duyne | 242—55.12 |
| 3,149,797 | 9/1964 | Pastor et al. | 242—55.13 |

FRANK J. COHEN, *Primary Examiner.*

G. F. MAUTZ, *Assistant Examiner.*